Nov. 14, 1967  G. H. LYSSY  3,352,146
METHOD AND MEANS FOR TESTING THE GAS PERMEABILITY
AND CLOSURE LEAKAGE OF CONTAINERS
Filed Dec. 8, 1965
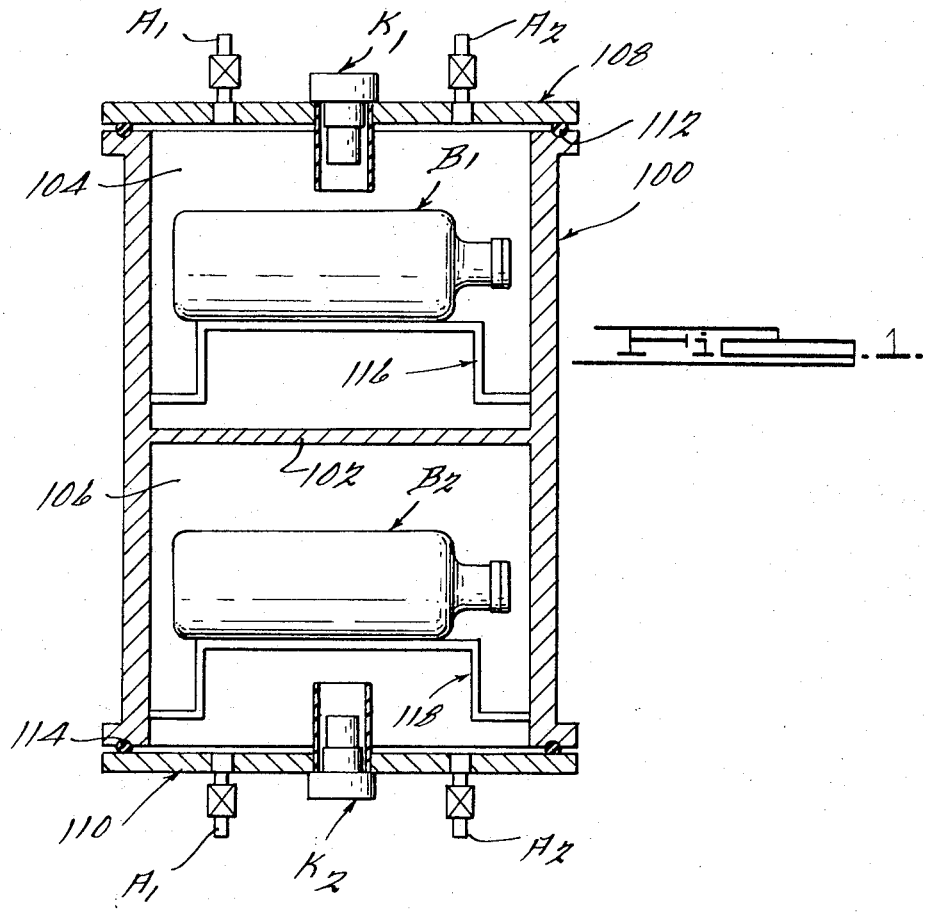
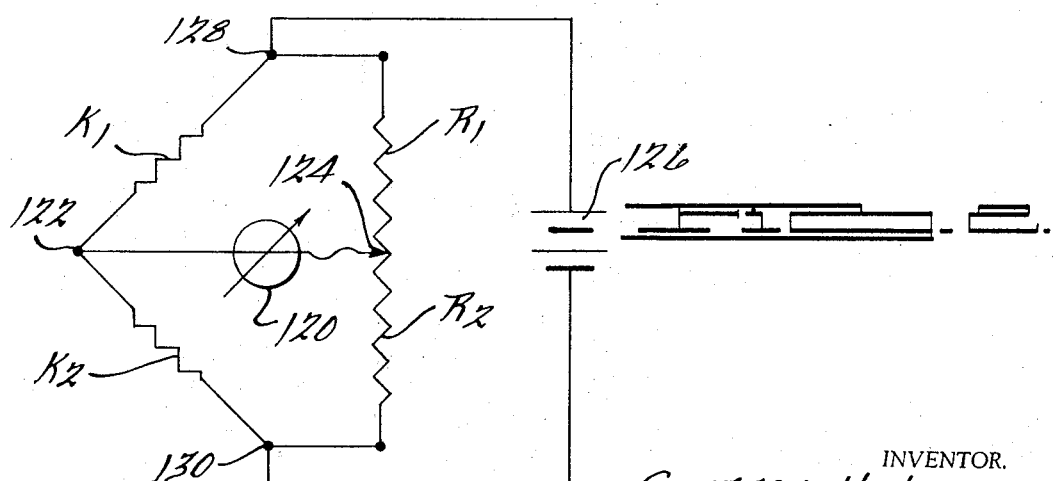
INVENTOR.
Georges H. Lyssy
BY
Harness, Dickey & Pierce
ATTORNEYS

United States Patent Office

3,352,146
Patented Nov. 14, 1967

3,352,146
METHOD AND MEANS FOR TESTING THE GAS PERMEABILITY AND CLOSURE LEAKAGE OF CONTAINERS
Georges H. Lyssy, Zollikon, Switzerland, assignor to Hans Sickinger Co., West Bloomfield Township, Mich., a corporation of Michigan
Filed Dec. 8, 1965, Ser. No. 512,413
3 Claims. (Cl. 73—38)

This invention relates to a method and means for the experimental determination of the gas permeability and closure leakage of packages or containers.

Methods heretofore used for testing the gas permeability of packages and their closures have suffered from several drawbacks. Among these former methods are those which involve storage, visual inspection and gas volume change measurements of containers. Other methods involve sequential sample removal from packages at predetermined time intervals with analysis of the gas samples removed. While the gas analysis can be performed quite well with proper choice of the method, the transfer of the sample from the package to the analyzing apparatus presents a serious if not insurmountable problem. Furthermore, since packages must be damaged when the gas sample is removed, successive checking becomes a problem over a long period of time.

It is an object of the present invention to overcome the disadvantages of previously known methods for testing the gas permeability of finished packages and their closures, and to provide a novel and improved method and apparatus for this purpose which is not destructive of the package and is a practical, workable testing system.

Other objects will become apparent from a study of the subsequent disclosure, claims and drawings.

In the drawings:

FIGURE 1 is a partially schematic cross-sectional view in elevation of an apparatus of the present invention which may be used either for the absolute or relative measurement of the permeability of packages, two packages being shown in the apparatus for relative measuring, and FIGURE 2 is a circuit diagram of a bridge circuit for the thermal conductivity detectors.

Briefly, the method of this invention consists of placing in an experiment chamber a sample such as a welded plastic package with its contents, a capsuled bottle or a glued or welded folded bag. This closed chamber, as well as the reference chamber, both in good thermal conductive contact, are filled with a reference gas such as helium.

A thermal conductivity detector is placed in each chamber, and the two detectors are connected in a compensating bridge circuit.

At the start of the experiment, the bridge circuit is brought into equilibrium. If a gas exchange takes place between the package and its surroundings, this gas exchange will cause a reduction in thermal conductivity of the experiment chamber. By observing changes in the bridge signal with respect to time, the gas exchange of the package within the measuring chamber can be analyzed qualitatively or, under certain conditions, quantitatively.

In a modified form of the invention, a second package or container is placed in the reference chamber and the permeability of one package relative to the other is measured.

Referring more particularly to the drawings, FIGURE 1 shows a test housing 100 having a central gas-impervious partition 102 which separates the housing into upper and lower chambers 104 and 106 respectively. Chamber 104 may be termed an experiment chamber and chamber 106 a reference chamber, and partition 102 is of high thermal conductivity so that the two chambers are in good thermally conductive contact.

The top and bottom of housing 100 are closed by suitable cover plates 108 and 110 respectively, suitable sealing means 112 and 114 being interposed between the cover plates and housing 100 to assure gas-tight joints.

Chamber 104 is provided with a thermal conductivity detector $K_1$ in the form of a katharometer, thermistor or semiconductor element, that is, an element having a negative or a positive temperature coefficient of resistance. Detectors $K_1$ and $K_2$ are connected with each other through a compensating bridge circuit described below. Two closable gas connections $A_1$ and $A_2$ are provided for each of chambers 104 and 106. These gas connections are capable of feeding a reference gas such as helium into the two chambers.

A platform 116 is provided in chamber 104 and a platform 118 in chamber 106. If it is desired to test a single package or container $B_1$, such as a capsuled bottle, this container is placed on platform 116. If a relative measurement of the permeability of two such packages $B_1$ and $B_2$ is desired, then the second package $B_2$ is placed on platform 118. Otherwise, chamber 106 does not enclose a package. In fact, if the apparatus is solely to be used for absolute measurements, no platform 118 need be provided in reference chamber 106.

The compensating bridge, shown in FIGURE 2, comprises variable resistances $R_1$ and $R_2$ arranged in series with each other and in parallel with the two elements $K_1$ and $K_2$, which in turn are connected in series with each other. One terminal of a galvanometer 120 is connected to the juncture 122 of $K_1$ and $K_2$. The other terminal 124 of galvanometer 120 is adjustable along $R_1$, $R_2$ so that the galvanometer may be set to zero at the beginning of the experiment. A source of current 126 is connected between the juncture 128 of $K_1$ and $R_1$ and the juncture 130 of $K_2$ and $R_2$.

Assuming that only sample $B_1$ is being tested, on an absolute basis, this sample is placed in chamber 104 and both cover plates secured to the housing. A reference gas such as helium is permitted to fill both chambers, the pressure in both chambers is equalized and the bridge circuit is brought into equilibrium. If a gas exchange takes place between the interior of package $B_1$ and chamber 104, this gas exchange will cause a reduction in the thermal conductivity of the gas within measuring chamber 104. Since the thermal conductivity of the gas in reference chamber 106 will remain constant, there being no container therein, the bridge circuit will become unbalanced, and by observing this unbalance with respect to time, the permeability and closure leakage properties of package $B_1$ may be analyzed.

If it is desired to test the permeability and closure leakage properties of two packages relative to each other, the second package $B_2$ will be placed in chamber 106 as stated previously. In this case, the thermal conductivities of both chambers 104 and 106 will be reduced as time goes on, assuming that there is a gas exchange between the interiors of both packages and their respective chambers.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an apparatus for testing the permeability and closure leakage properties of a package, a housing having an experiment chamber and a reference chamber, said chambers being in thermally conductive contact but sealed from each other and from the outside of the housing, removable gas-tight covers for said chambers, means for causing gas to be fed under pressure into each of said chambers and sealed therein, means in said experiment chamber for supporting a container to be tested therein, a thermal conductivity measuring element mounted on each of said chambers, and a bridge circuit connecting said elements.

2. In a method for testing the gas permeability and closure leakage properties of a package, the steps of placing said package in a gas-tight experiment chamber, maintaining said chamber and a gas-tight reference chamber at substantially the same temperature, filling said chambers with a gas at substantially equal pressures, and measuring the relative changes in thermal conductivity between said two chambers in response to gas exchange taking place between the interior of the package and said experiment chamber.

3. The combination according to claim 2, including the further step of placing a second package in said reference chamber before the chambers are filled with gas whereby the relative changes in thermal conductivity between the two chambers will reflect the relative gas permeability and closure leakage rates of the two packages.

References Cited

UNITED STATES PATENTS

| | | | |
|---|---|---|---|
| 1,304,208 | 5/1919 | Shakespear | 73—38 X |
| 3,012,432 | 12/1961 | Moore et al. | 73—49.2 X |
| 3,097,518 | 7/1963 | Taylor et al. | 73—27 X |
| 3,301,043 | 1/1967 | Lyssy | 73—38 |

LOUIS R. PRINCE, *Primary Examiner.*

WILLIAM HENRY II, *Assistant Examiner.*